Jan. 19, 1937. C. L. HOWSE 2,068,135
WATER LEVEL INDICATOR
Filed Oct. 20, 1930
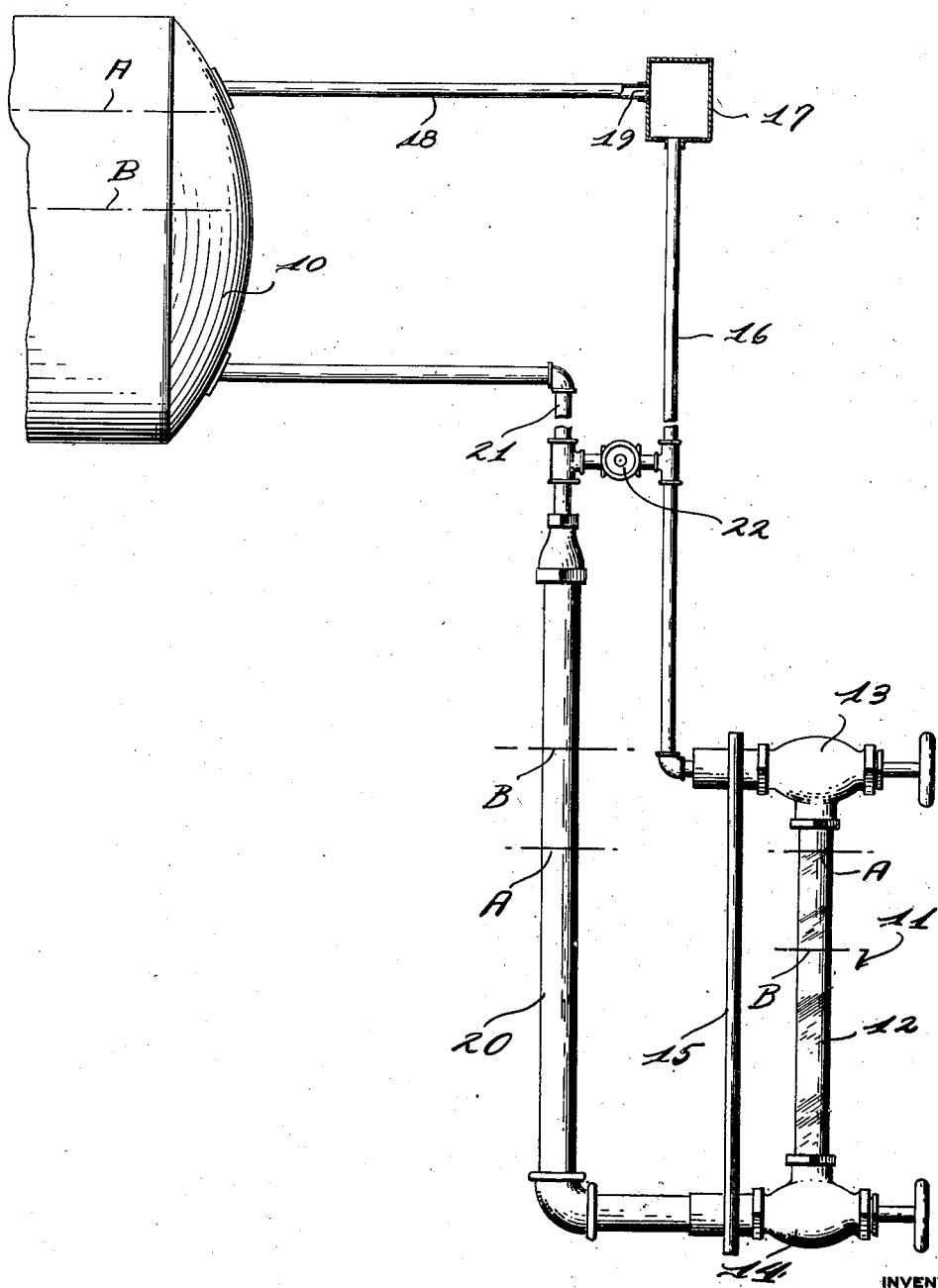
INVENTOR
Curtis L. Howse
BY
Whittemore Hulbut
Whittemore & Belknap
ATTORNEYS Patented Jan. 19, 1937

2,068,135

UNITED STATES PATENT OFFICE 2,068,135

WATER LEVEL INDICATOR

Curtis L. Howse, Birmingham, Mich., assignor to Diamond Power Specialty Corporation, Detroit, Mich., a corporation of Michigan Application October 20, 1930, Serial No. 490,072

4 Claims. (Cl. 73—54)

This invention relates to water level indicators and has particular reference to a device of this character adapted to indicate the level of water in a boiler drum or the like.

The invention contemplates in particular the provision of a construction for indicating at a lower level than the boiler drum, the exact level of the water in the drum.

The invention further contemplates the provision of means for checking the actuation of the indicating device.

Other objects and advantages of the invention will become more apparent as the following description proceeds, particularly when reference is had to the single figure of the drawing which is an elevational view partly in section showing an indicating device constructed in accordance with the teachings of this invention associated with a boiler.

Referring then particularly to the drawing there is shown a boiler drum 10 and an indicating device designated generally by the reference character 11 for indicating the level of the water in the boiler drum. It will be noted that the indicating device is located at a level considerably below the level of the boiler drum so that this indicating device may be positioned where it may be readily viewed by the boiler attendant.

The indicating device includes a gauge glass 12 mounted at its ends in suitable valve casings 13 and 14 which are supported by a bracket or the like 15. The valve casing 13 is connected to a vertically extending pipe 16 of relatively small internal diameter and this pipe communicates at its upper end with a chamber 17 which constitutes a reservoir. A pipe 18 provides communication between the reservoir 17 and the steam space of the boiler and an orifice plate 19 is arranged at the point of communication between the pipe 18 and the chamber 17. Connected to the valve casing 14 is a tube 20, the internal diameter of which is somewhat greater than the internal diameter of the tube 16, and to the upper end of the tube 20 there is connected a tube 21 which communicates with the water space of the boiler drum 10.

The tubes 20 and 12 are partly filled with a liquid which is heavier than water and insoluble in water and colored so as to be easily distinguished from water. The liquid used may be carbon tetrachloride or tetrachlorethane, or any similar liquid, the two above-mentioned liquids having specific gravities of 1.59 and 1.58 respectively. The liquid used may be colored by any suitable substance, such as "oil red", the liquids used being such as not to be affected by any boiler cleaning compounds used or the amount of heat which might be met in service. A valved by-pass 22 is preferably provided, connecting the tubes 16 and 21, this by-pass providing for checking of the indicating device, as will hereinafter be more fully described.

The internal diameter of the tube 20 and glass 12 are proportioned so as to give a deflection of liquid level in glass 12 equal to the change in water level in the boiler. In operation the reservoir 17 will be kept filled by condensation of the steam and this reservoir will, of course, overflow when the water level in the boiler rises and will be refilled by condensation when the water level in the boiler drum is lowerd. Thus, the pressure on the upper end of the column of indicating liquid in gauge glass 12 will be kept constant in that it will always be the pressure of the vertical column of water in the tube 16 and the pressure of the boiler. The pressure acting on the lower end of the column of indicating liquid will be variable, dependent upon the level of the water in the boiler drum. Thus, if the water level rises from the point marked B in the boiler drum to the point marked A, the column of indicating liquid in the tube 20 will be forced downwardly and the level of the indicating liquid in tube 12 will rise from point B to point A. Thus, there will be a direct indication in the tube 12 of the level of the water in the boiler drum.

It will be understood that the by-pass 22 is normally closed by any suitable valve arranged in this by-pass. If it is desired to check the accuracy of the indicating device, the valve controlled by-pass may be opened to permit the equalization of water column between the two tube legs. When this is done the indicating liquid should then return to a predetermined zero setting which will indicate that none of this indicating liquid has been lost by leakage. Further, the by-pass provides an equalizing means which may be opened when the boiler is drained or when difference in water level otherwise becomes excessive.

From the above it will be apparent that the invention provides an indicating device which is adapted to show at a lower level than the boiler drum the level of the water in the boiler drum. Additionally, the invention provides means for checking the actuation of the indicating device to determine whether or not any of the indicating liquid has been lost by leakage.

While the invention has been described with some detail, it is to be understood that the description is for the purposes of illustration only and that the right is reserved to make such changes in the details of construction and arrangement of parts as will fall within the purview of the attached claims.

What I claim as my invention is:

1. A liquid level indicator including a U-bend pipe with vertical legs in communication with the liquid-containing space and with the space above said liquid, said pipe containing a column of an indicating liquid having a specific weight exceeding that but less than double that of the liquid whose level is to be indicated, and means for maintaining a constant liquid level in one leg of said U-bend pipe whereby one end of said column of indicating liquid is subjected to a constant pressure and the other end of said column of indicating liquid is subjected to a variable pressure dependent upon the level of the liquid whose level is to be indicated, the relative cross sections of the parts of the pipe within the range of movement of the indicating liquid having a definite relation directly dependent on the specific weight of the indicating liquid, this relation being such as to obtain fluctuations of the indicating liquid which are equal to the fluctuations of the liquid whose level is to be indicated.

2. In combination, a boiler drum, a gauge glass located below said boiler drum, a vertically extending pipe connected to the upper end of said gauge glass, a reservoir at the top of said vertically extending pipe, a connection between said reservoir and the steam space of the said boiler drum, a second vertically extending pipe having an enlarged portion adjacent its lower end connected to the lower end of said gauge glass, a connection between said second mentioned vertically extending pipe and the water space of said boiler drum, and a column of indicating liquid in said gauge glass and the enlarged portion of the second mentioned pipe, said indicating liquid having a specific weight exceeding that but less than double that of the water in the boiler drum and the relative cross sections of the gauge glass and the enlarged portion of the second pipe bearing a definite relation directly dependent on the specific weight of the indicating liquid, this relation being such as to obtain fluctuations of the indicating liquid which are equal to the fluctuations of the water in the boiler drum.

3. In a liquid level indicator, a container for the liquid whose level is to be indicated, a gauge glass, a column of an indicating liquid in said gauge glass, said indicating liquid having a specific weight exceeding that but less than double that of the liquid whose level is to be indicated, means for subjecting one end of said column of indicating liquid to a substantially constant pressure, and means for subjecting the other end of said column of indicating liquid to a variable pressure dependent upon the level of the liquid in said container, the cross sectional area of said gauge glass bearing a definite relation to the cross sectional area of said last mentioned means, this relation being directly dependent on the specific weight of the indicating liquid and being such that fluctuations of the indicating liquid are obtained in the gauge glass which are equal to the fluctuations of the liquid in the container.

4. In a device of the character described, a boiler drum, a substantially U-shaped pipe having vertical legs in communication with the water containing space and with the space above the water in the boiler drum, said pipe containing a column of an indicating liquid having a specific weight greater than 1 but less than 1.6, and means for maintaining a constant liquid level in one leg of said U-shaped pipe whereby one end of said column of indicating liquid is subjected to a constant pressure and the other end of said column of indicating liquid is subjected to a variable pressure dependent upon the level of the liquid whose level is to be indicated, the relative cross sections of the parts of the pipe within the range of movement of the indicating liquid having a definite relation directly dependent on the specific weight of the indicating liquid, this relation being such as to obtain fluctuations of the indicating liquid which are equal to the fluctuations of the water in the boiler drum.

CURTIS L. HOWSE.